United States Patent
Su

(10) Patent No.: US 6,474,174 B2
(45) Date of Patent: Nov. 5, 2002

(54) ULTRASONIC MULTI-CHANNEL FLOW MEASURING METHOD

(75) Inventor: Tyan Khak Su, Ottawa (CA)

(73) Assignees: International Hydrosonic Co., Ltd., Seoul (KR); Hydrosonic International Co., Ltd., Ontario (CA)

( * ) Notice: Subject to any disclaimer, the term of this patent is extended or adjusted under 35 U.S.C. 154(b) by 0 days.

(21) Appl. No.: 09/752,452

(22) Filed: Jan. 3, 2001

(65) Prior Publication Data

US 2002/0050176 A1 May 2, 2002

(30) Foreign Application Priority Data

Sep. 15, 2000 (KR) .......................................... 2000-54334

(51) Int. Cl.$^7$ ................................................. G01F 1/66
(52) U.S. Cl. .................................................. 73/861.31
(58) Field of Search .................... 73/861.31, 861.27, 73/861.28, 861.29, 861.18, 194; 361/151

(56) References Cited

U.S. PATENT DOCUMENTS 4,103,551 A * 8/1978 Lynnworth .................... 73/194
5,228,347 A * 7/1993 Lowell et al. ............ 73/861.28
6,089,104 A * 7/2000 Chang ...................... 73/861.27
6,209,388 B1 * 4/2001 Letton et al. .............. 73/61.79

* cited by examiner

Primary Examiner—Benjamin R. Fuller
Assistant Examiner—Jewel V. Thompson
(74) Attorney, Agent, or Firm—Lee & Sterba, P.C.

(57) ABSTRACT

An ultrasonic flow rate measuring method comprises steps of measuring an inner diameter of a pipe in a manner to subtract a corrosive resistance layer and its possible thickness deviation from the maximum deviation of an inner diameter presented as a pipe size within the range of being able to be estimated, measuring a flow rate $Q_I$ of the ideal circular section having the measured inner diameter based on the ultrasonic multi-channel flow rate measuring method, calculating a flow rate $Q_{II}$ of the remaining section according to a flow velocity distribution curve and adding the flow rate $Q_{II}$ to the flow rate $Q_I$ to calculate a total flow rate Q. Therefore, the method can enhance the accuracy of the flow rate measurement, if the section area of a pipe can't be measured, exactly, and the inner diameter of the pipe has a deviation due to an ovalness.

7 Claims, 6 Drawing Sheets

ULTRASONIC MULTI-CHANNEL FLOW MEASURING METHOD

BACKGROUND OF THE INVENTION

1. Field of the Invention

The invention is related to an ultrasonic flow measuring technology, and particularly, to an ultrasonic multi-channel flow measuring method for enhancing the accuracy of the flow or flow rate measurement, if pairs of ultrasonic transducers are mounted on a pipe that had been already arranged on a place.

2. Description of the Background

A general ultrasonic flow measuring method in a pipe has something in common as follows; a flow rate is obtained by measuring a flow velocity on a diametric line or a plurality of chords of a fluid flow section using an ultrasonic wave and multiplying the flow velocity by a fluid section area. For example, if the flow velocity $V_D$ is measured on the diametric line based on an ultrasonic one-channel flow measuring method using an ultrasonic wave, the flow rate Q is calculated as follows:

$$Q = K \cdot V_D \cdot S \tag{1}$$

Wherein, K<1.0 is a flow coefficient and S is a fluid flow section.

The flow measuring method is available under the condition that K=constant. In other words, a straight part of a pipe must be sufficiently longer. And, it is also preferable that Reynolds number>$10^4$.

On the other hand, even through the flow velocity distribution is irregular and K is not constant, an ultrasonic multi-channel flow measuring method is known as a method capable of measuring a flow rate in a high accuracy.

Typical ultrasonic multi-channel flow measuring methods and apparatuses therefor are disclosed as follows:

U.S. Pat. No. 5,531,124 granted on Jul. 2, 1996
U.S. Pat. No. 4,646,575 granted on Jul. 25, 1987
Japanese Patent No. 2676321 granted on Jul. 25, 1997

The ultrasonic multi-channel flow measuring method has features as follows; as shown in FIG. 1, the flow rate Q is calculated in a manner to measure a flow velocity on a plurality of chords in parallel to a diametric line of a fluid section to reproduce a flow velocity distribution curve, calculate an average flow velocity $V_S$ of the fluid section and then multiply the average flow velocity $V_S$ by the fluid section area S, or in a manner to double-integrate the section area that is changed according to the flow velocity distribution and the diameter. Therefore, the ultrasonic multi-channel flow measuring method doesn't need the flow coefficient.

$$Q = V_S \cdot S \tag{2}$$

or $$Q = \int_S \int V(r) S(r) dr \cdot dr \tag{3}$$

For it, even if the straight portion of the pipe is relatively shorter and the flow velocity distribution is asymmetrical, the flow rate can be somewhat accurately measured. As described above, the common point of the ultrasonic flow measuring methods exists in that the flow velocity is measured using an ultrasonic wave and multiplied by the section area S to calculate the flow rate.

The ultrasonic flow meter has a greatest feature as follows; unlike another flow meter, transducers for measuring the flow rate can be mounted on a pipe that has been already arranged. In other words, in case of the ultrasonic multi-channel flow meter, the flow rate measuring can be established only by the mounting of paired transducers mounted, even through the pipe has been previously arranged. Therefore, there has been developed a technology for mounting the paired transducers on the pipe without stopping the flow of water. Especially, even in case of a pipe of a greater inner diameter, it allows a flow measuring apparatus to be installed in-site after the completing of the pipe arrangement. It means that the manufacturing of a pipe portion of a flow meter having a larger volume and weight and its transportation into a working site is not necessary. The previous welding work of a flange for mounting the flow meter also is not required.

The ultrasonic flow meter to be mounted on the previously arranged pipe pays attention to the follows; in case of the ultrasonic multi-channel flow meter, a flow measuring error can be checked in a higher reliability in site. Because the flow velocity is measured on a plurality of chords using an ultrasonic wave, a flow velocity distribution curve is to be written out. Therefore, according to a shape of the flow velocity distribution curve, a computation programming error $\delta_{sw}$ of a section average flow velocity $V_S$ can be checked.

And, if the flow velocity is measured on the chord by a transit time difference method, ultrasonic transit times $t_1$ and $t_2$, measuring errors $\delta_{t1}$ and $\delta_{t2}$, an error $\delta_{\Delta t}$ of a time difference $\Delta t = t_2 - t_1$, a measuring error $\delta_L$ of a transit distance L, an error of a projective distance $d = L_{cos\ \psi}$ on L, etc. are checked thereby to confirm a flow velocity measuring error $\delta_V$. Like this, a flow measuring error $\delta_Q$ can be indirectly measured, and a maximum flow measuring error $\delta_{Qmax}$ that can be expected is as follows:

$$\delta_{Qmax} = \delta_V + \delta_{SW} + \delta_S \tag{4}$$

Wherein, $\delta_S$ is a fluid section measuring error, and $\delta_{SW}$ is an error of a section average flow velocity or a double-integration of Vs and S. A transit time difference method for measuring the flow velocity well-known is as follows:

$$V = \frac{L^2}{2d} \Delta \frac{t}{t_2 - t_1} \tag{5}$$

Therefore, $\delta_V$ is as follows:

$$\delta_V = (2\delta_L + \delta_d) + \sqrt{\delta^2_{t1} + \delta^2_{t2} + \delta^2_{\Delta t}} = (2\delta_L + \delta_d) + \sqrt{2\delta^2_{t1,2} + \delta^2_{\Delta t}} \tag{6}$$

Wherein, $\delta_L$ and $\delta_d$ are a measuring error of interval distances L and d to be inputted into a flow velocity arithmetic logic processor or microprocessor. The symbols of L and d are not changed during the measuring of the flow velocity. But, errors $\delta_L$ and $\delta_d$ of the transit time measuring are represented as an average square error because an accidental error component is larger.

The computation programming error $\delta_{sw}$ can be obtained using a computer for calculating the expressions (2) and (3) according to various flow velocity distribution curve. Therefore, the measuring errors $\delta_V$ and $\delta_{SW}$ can be checked in a higher reliability, but if the ultrasonic flow meter is mounted in site, it is very hard to check the fluid section measuring error $\delta_S$, exactly. For it, $\delta_S$ becomes larger, so the flow rate measuring error can be increased. The cause is as follows:

If the fluid section is an ideal circular, its section S is as follows:

$$S = \frac{\pi}{4} \times D^2 \qquad (7)$$

Wherein, D is an inner diameter of a pipe.

But, it is not possible to measure the inner diameter of the pipe that has been already arranged, directly. A simplest method is to calculate the section area using the inner diameter of a pipe presented by a manufacturer, but the inner diameter might be different from that of the pipe already arranged. For it, it is not possible to confirm the fluid section measuring error $\delta_S$ of the section area S. Furthermore, if a corrosive resistance layer is formed on the inner surface of the pipe, its thickness can't be measured, exactly. The section of the pipe is not explicitly circular, because the pipe may be deformed in the process of the storage, transportation and its arrangement work, resulted from being oval. Under the environmental condition, a measuring error $\delta_D$ of an inner diameter D may be largely increased. The fluid section measuring error $\delta_S$ is as follows;

$$\delta_S = 2\delta_D \qquad (8)$$

If D=600 mm and its absolute error $\Delta_D$=8 mm, $$\delta_D = \left(\frac{8}{600}\right) \times 100 \approx 1.34\%$$

The fluid section measuring error $\delta_S$ is as follows:

$$\delta_S = 2 \times 1.34 = 2.68\%$$

Therefore, even through the flow velocity is exactly measured, the flow rate measuring error is not reduced to less than $\delta_S$. Particularly, in case of a pipe having a larger diameter, its section easily becomes a larger oval ness. As a result, if the ultrasonic transducer is mounted on the pipe that has already been arranged in order to measure the flow rate, it is difficult to exactly measure the fluid section area S. Further, the fluid section measuring error $\delta_S$ becomes larger, and so the flow rate measuring error $\delta_Q$ is increased.

When the flow rate Q is calculated by the double-integration of the expression (3) based on the ultrasonic multi-channel flow rate measuring method, assuming that the section S is circular, the function S(r) is used (r is a radius variable). If the section S is oval, not circular, the double-integration also has a larger error. As a flow velocity distribution curve V(r) is considered to be between intervals −R and +R as shown in FIG. 1, the double-integration error occurs due to a measuring error $\delta_D$ of D=2R.

An object of the invention is to provide an ultrasonic multi-channel flow rate measuring method for significantly reducing the flow rate measuring error under the condition that the inner section area of a pipe can't be measured, when a plurality of paired transducers are mounted on the pipe already arranged in site.

SUMMARY OF THE INVENTION

According to the invention, an ultrasonic flow rate measuring method comprises steps of measuring an inner diameter of a pipe in a manner to subtract a corrosive resistance layer and its possible thickness deviation from the maximum deviation of an inner diameter presented as a pipe size within the range of being able to be estimated, measuring a flow rate $Q_I$ of the ideal circular section having the measured inner diameter based on the ultrasonic multi-channel flow rate measuring method, calculating a flow rate $Q_{II}$ of the remaining section according to a flow velocity distribution curve and adding the flow rate $Q_{II}$ to the flow rate $Q_I$ to calculate a total flow rate Q. Therefore, the method can measure not only the flow rate in the ideally circular fluid section of the inner diameter of the pipe, but also the flow rate in a higher reliability even under the condition that the inner diameter of a pipe can't be measure, exactly.

More concretely, when paired transducers are intended to mount on a pipe already arranged and realize an ultrasonic multi-channel flow rate measuring method, a predictable maximum deviation $\Delta D$ of an inner diameter presented as a pipe standard, a thickness a of a corrosive resistance layer and its possible thickness deviation $\Delta_a$ are obtainable as follows:

$$D = D_S - (\Delta D + 2a + 2\Delta_a) \qquad (9)$$

The flow rate $Q_I$ is measured with such like ideal circular section $$S_I = \frac{\pi}{4} \cdot D^2$$

having the inner diameter D according to the ultrasonic multi-channel flow rate measuring method, and then the remaining section $S_{II}$ is as follows:

$$S_{II} = \frac{\pi}{4}(D_S - D)^2 = \pi(R_S - R)^2 \qquad (10)$$

The flow rate $Q_{II}$ is calculated corresponding to the remaining section $S_{II}$ according to the flow velocity distribution curve and added to the flow rate $Q_I$ in order to measure the total flow rate Q. The total flow rate Q is as follows:

$$Q = Q_I + Q_{II} \qquad (11)$$

In that case, assuming that an error of $Q_{II}$ is $\delta_{QII}$, $\delta_{QII}$ takes an effect on the total flow rate Q as follows:

$$\delta_{IIQ} = \frac{Q_I + Q_{II}(1 + \delta_{QII})}{Q_I + Q_{II}} - 1 + \frac{\delta_{QII}}{1 + \frac{Q_I}{Q_{II}}} \qquad (12)$$

If $Q_I \approx 50 Q_{II}$, an increasing rate $\delta_Q$ of the total flow rate measuring error depended upon $\delta_{QII}$ is $$\frac{\delta_{QII}}{51}.$$

Even if the increasing rate $\delta_Q$ is over $\delta_{QII}$=20%, $\delta_Q \approx 0.4\%$. Therefore, the flow rate Q can be measured in a higher accuracy even under the condition that the inner diameter is exactly not measured. Herein, it is noted that $Q_I$ is exactly measured by using an ultrasonic wave in a fluid section of an ideal circle having an inner diameter D.

BRIEF DESCRIPTION OF THE DRAWINGS

The invention will be described in detail with reference to the accompanying drawings, in which.

and $$\frac{\Delta R}{R_s}$$

Figure 5:
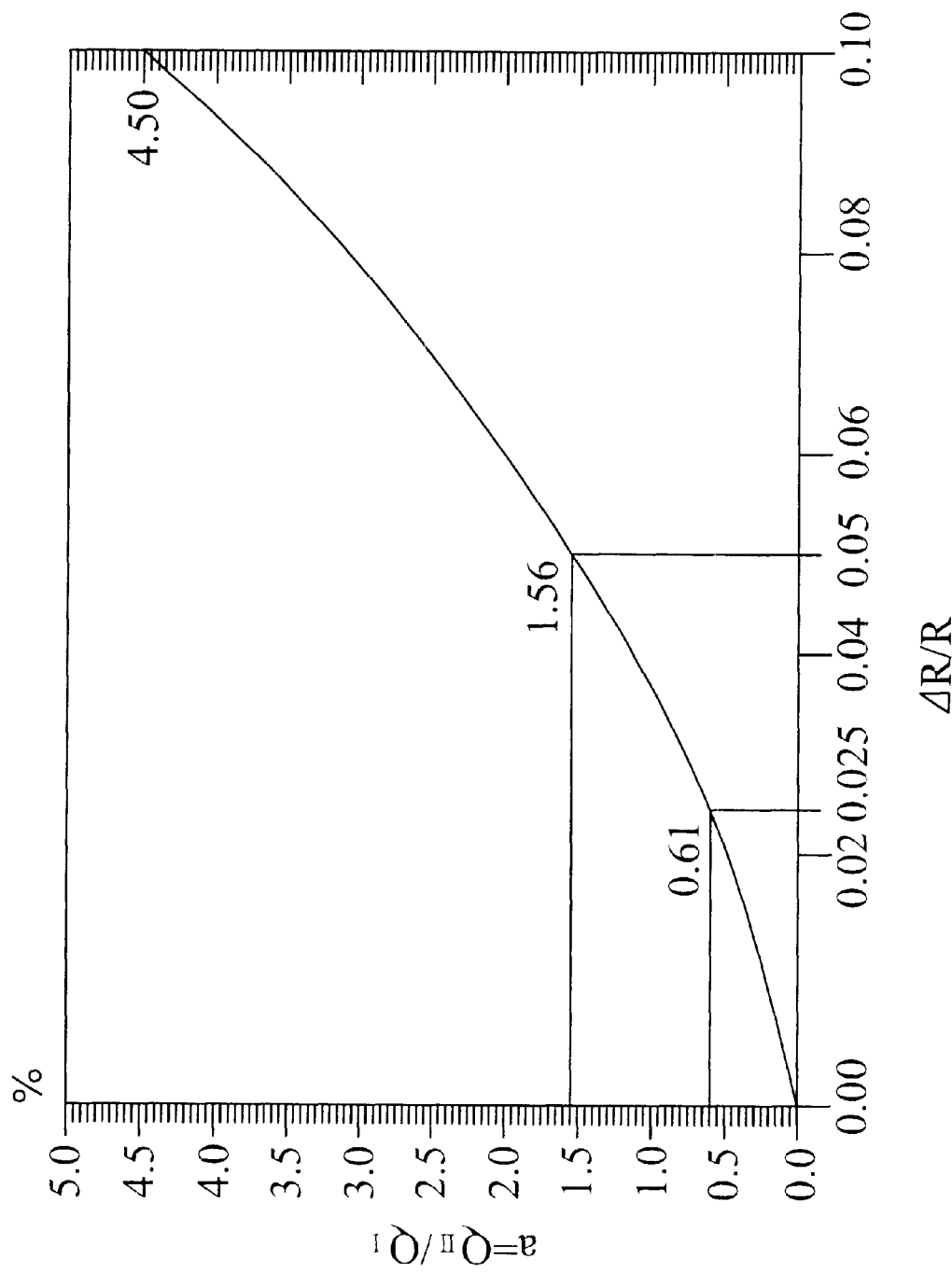
Figure 6:
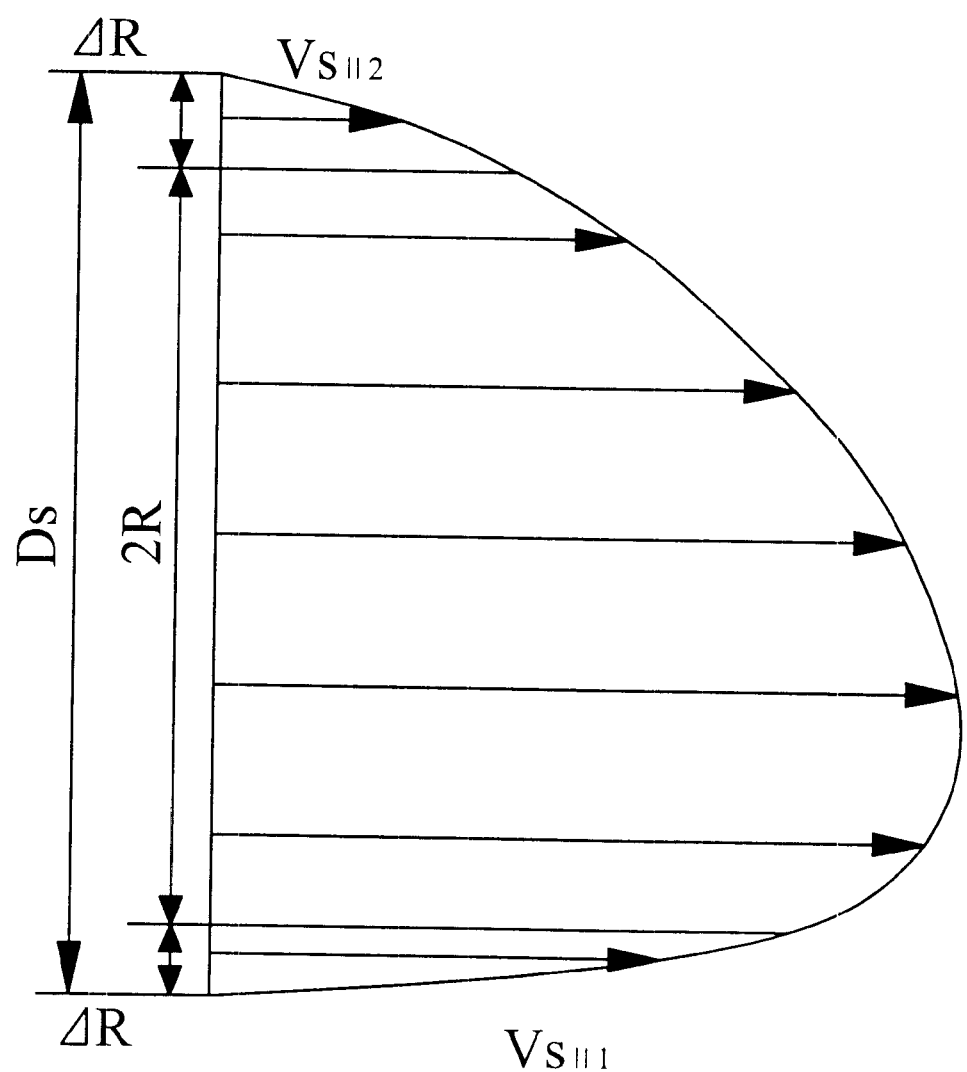

of each of section average flow velocities $V_{SI}$ and $V_{SII}$ in a circular section $S_I$ of $R=(R_S-\Delta R)$ and an oval section $S_{II}=\pi(R_S-R)^2$, FIG. 5 is a view illustrating a function curve between ratios $$\frac{Q_{II}}{Q_I} \text{ and } \frac{\Delta R}{R_s}$$

of each of a flow rate $Q_{II}$ and $Q_I$ in the sections $S_I$ and the oval section $S_{II}$; and, FIG. 6 is a view illustrating a flow velocity distribution curve formed in an asymmetrical arrangement.

DETAILED DESCRIPTION OF THE INVENTION

Figure 1:
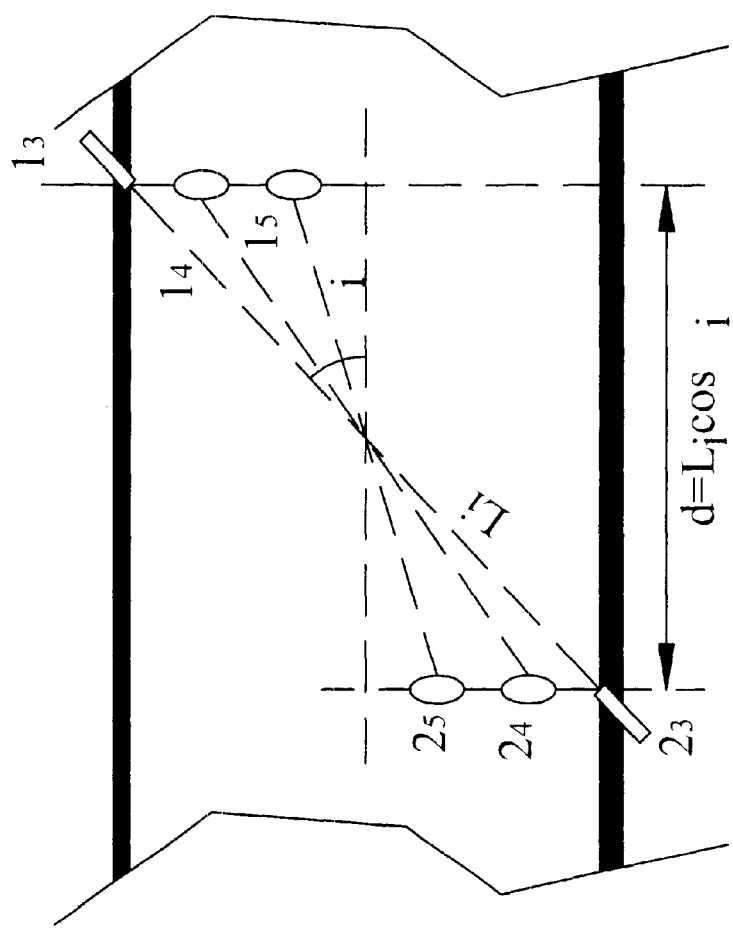
FIG. 1 is views illustrating the principle of an ultrasonic multi-channel flow rate measuring method according to a prior art.
Figure 1:
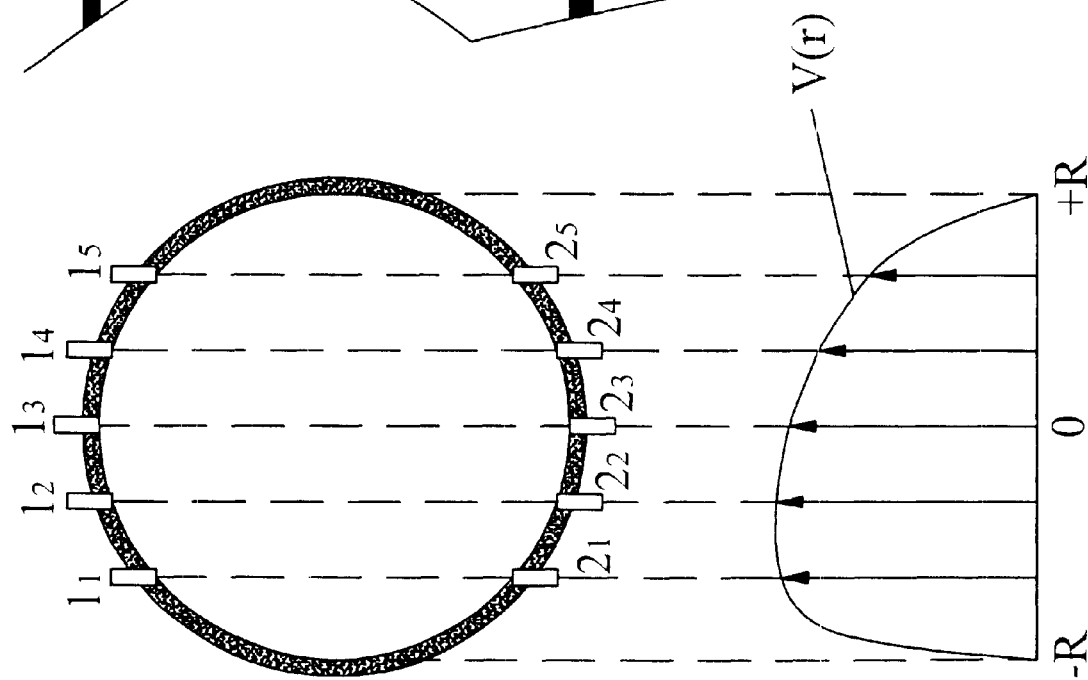
Figure 2A:
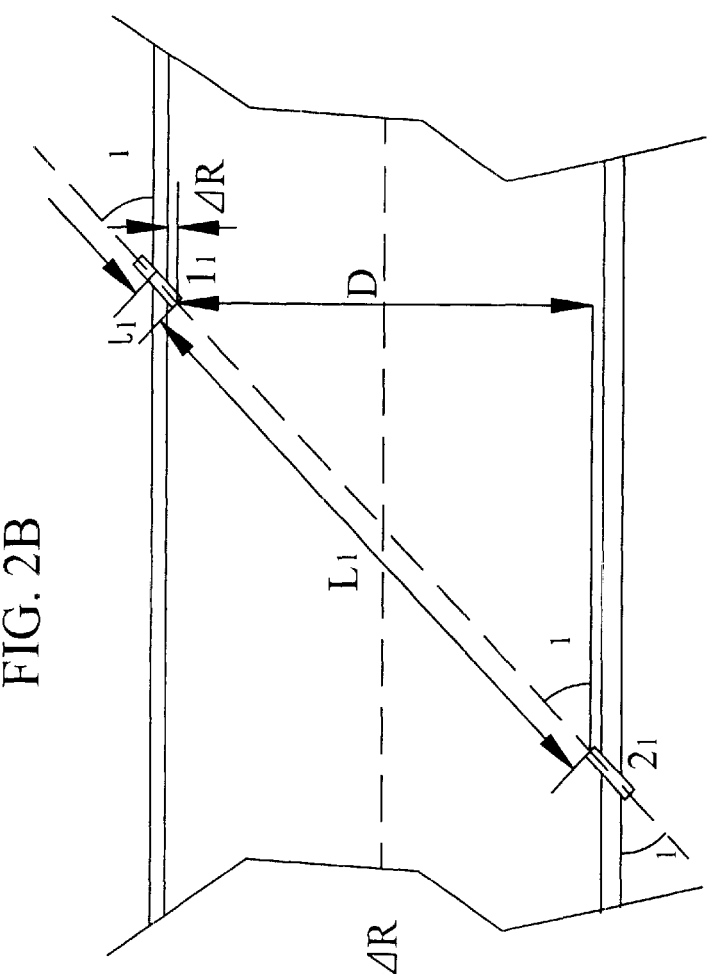
FIG. 2 is a view illustrating the principle of an ultrasonic multi-channel flow rate measuring method according to the invention.
Figure 2B:
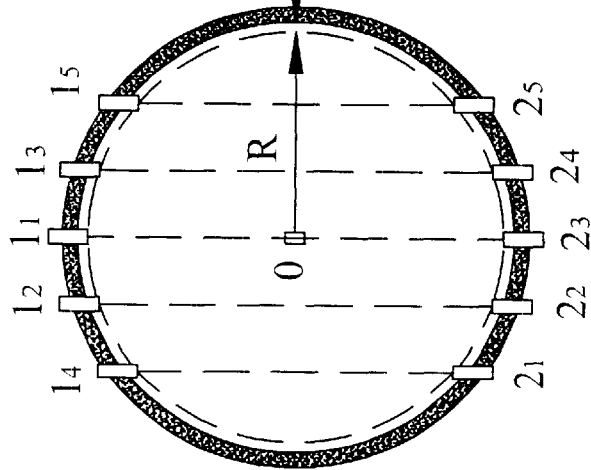

Referring to FIG. 2, if the inner diameter of a pipe can't be directly measured, or particularly in case of a pipe having a larger diameter, there is likely to become oval. If an inner diameter $D_S$ presented by a manufacturer of a pipe is substituted into the calculation expression of a section S, a section error may be largely increased. In that case, a plurality of paired transducers $1_i$ and $2_i$ are mounted to force a circumferential line of an ideal circle having a radius $$R = R_s - \Delta R = R_s \left(1 - \frac{\Delta R}{R_s}\right)$$

smaller than the inner diameter RS of the pipe standard to be corresponded to the transiting/receiving surface thereof. $R_S$ is a one-half of the inner diameter $D_S$ presented in the pipe standard. At that time, $\Delta R$ is selected as follows: $\Delta R$ is calculated using a deviation $\Delta D$ of an inner diameter presented by a manufacturer of a pipe and sum $(a+\Delta a)$ of a corrosive resistance layer and its possible deviation thickness.

$$\Delta R = \alpha \left(\frac{\Delta D}{2} + a + \Delta a\right) \quad (13)$$

Wherein, $\alpha$ is a reserve coefficient that is multiplied if the reliability of $\Delta D$, $\Delta a$ is lower. The coefficient $\alpha>1.0$.

If a deviation of the inner diameter is not fixed, $\Delta D$ is obtained in a manner to measure an outer diameter of a pipe at a plurality of points on the outer circumferential surface of the pipe.

On the basis of $\Delta R$ obtained above, mounting angle $\phi_i$ of paired transducers $1_i$ and $2_i$ and a length $l_i$ that the transducers are inserted to the circumferential line of a circular having a radius $R=R_S-\Delta R$ are calculated as follows:

$$l_i = \frac{\Delta R}{\sin\varphi_i} \quad (14)$$

Based on the expression, paired transducers are mounted on the pipe. Thereafter, fluid is filled up in the pipe, a sound velocity C is measured by a three-point method and an ultrasonic transit time $t_i$ between paired transducers $1_i$ and $2_i$ is measured to calculate an interval $L_i=C \cdot t_i$ between paired transducers, wherein the measuring method of Li is disclosed in U.S. Pat. No. 5,531,124 issued on Jul. 14, 1996 and U.S. Pat. No. 5,780,747 issued on Jul. 14, 1998 according to the measuring result of $L_i$, it is judged whether the transiting/ receiving surface of the transducer corresponds to the circumference of the circle having the radius $R=R_S-\Delta R$. If necessary, the position of the transducer is adjusted. And, a value of $R=R_S-\Delta R$ or $D=D_S-2\Delta R$ is obtained using the mounting angle $\phi_I$ of paired transducers $1_i$ and $2_i$ and the interval $L_i$ between paired transducers as follows:

$$D=L_{I\times\sin\phi_I}-2R \quad (15)$$

And then it is judged whether $R=R_S-\Delta R$ is selected.

A fluid section $S_I$ of the flow rate $Q_I$ measured by an ultrasonic wave is as follows:

$$S_I = \pi R^2 = \pi R_S^2 \left(1 - \frac{\Delta R}{R_S}\right)^2 \quad (16)$$

Assuming that an average flow velocity in the section $S_I$ is $V_{SI}$, the flow rate $Q_I$ is as follows:

$$Q_I = S_I \cdot V_{SI} = \pi R_S^2 \left[1 - \left(\frac{\Delta R}{R_S}\right)^2\right] \cdot V_{SI} \quad (17)$$

A section $S_{II}$ that is not measured by the ultrasonic wave is as follows:

$$S_{II} = \pi(R_S^2 - R^2) = \pi\left[R_S^2 - R_S^2\left(1 - \frac{\Delta R}{R_S}\right)^2\right] = \pi R_S^2\left[1 - \left(1 - \frac{\Delta R}{R_S}\right)^2\right] \quad (18)$$

If an average flow velocity of the oval section $S_{II}$ is $V_{SII}$, the flow rate $Q_{II}$ in the section $S_{II}$ is as follows:

$$Q_{II} = \pi R_S^2 \left[1 - \left(1 - \frac{\Delta R}{R_S}\right)^2\right] \cdot V_{SII} \quad (19)$$

Wherein, $V_{SII}$ is a value that is not measured. Only the flow velocity distribution curve is used to calculate the value.

First, a ration of $$\frac{Q_{II}}{Q_I}$$

is obtained as follows:

$$\alpha = \frac{Q_{II}}{Q_I} = \frac{\pi R_S^2\left[1 - \left(1 - \frac{\Delta R}{R_S}\right)^2\right]V_{SII}}{\pi R_S^2\left[1 - \frac{\Delta R}{R_S}\right]^2 V_{SI}} = \quad (20)$$

$$\frac{1 - \left(1 - \frac{\Delta R}{R_S}\right)^2 V_{SII}}{\left(1 - \frac{\Delta R}{R_S}\right)^2 V_{SI}} = \left[\frac{1}{1 - \frac{\Delta R^2}{R_S}} - 1\right]\frac{V_{SII}}{V_{SI}}$$

Of course, $V_{SII} \ll V_{SI}$, and $Q_{II} \gg Q_I$. The ratio $a \ll 1.0$, and $$\frac{1}{a} \gg 1.0.$$

$V_{SII}$ and $V_{SI}$ are a function of $$\frac{\Delta R}{R_S}.$$

Figure 3:
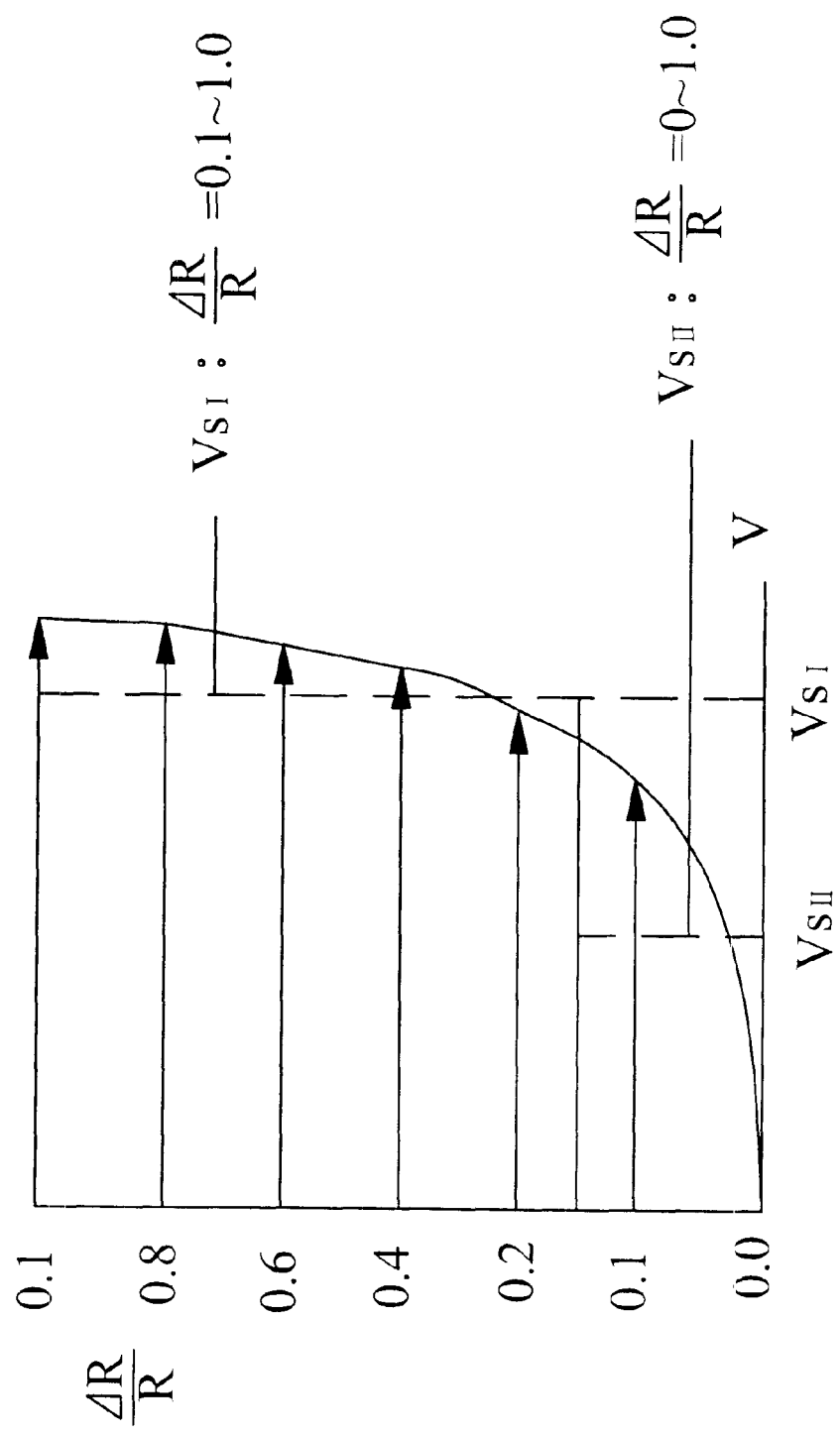
FIG. 3 is a view illustrating a flow velocity distribution curve formed in a symmetrical arrangement of a fluid section.

Referring to FIG. 3, a flow velocity distribution curve is illustrated, if a straight tin portion of a pipe is sufficiently longer and the flow velocity distribution is symmetrical at a normal state. A Y coordinate is $$\frac{\Delta R}{R},$$

and a X coordinate is $$\frac{V}{V_0}.$$

$V_O$ is a flow velocity on the centerline or diameter line of the pipe. A ratio of average flow velocities between an interval $$0 \sim \frac{\Delta R}{R_S}$$

and between an interval $$0 \sim \frac{\Delta R}{R_S} \text{ is } \frac{V_{SII}}{V_{SI}}.$$

The ratio is as follows:

$$\frac{V_{SII}}{V_{SI}} = \frac{\frac{R}{\Delta R} \int_0^{\frac{\Delta R}{R}} \cdot V(r) \cdot dr}{\frac{1}{1 - \frac{\Delta R}{R}} \int_{\frac{\Delta R}{R}}^1 \cdot V(r) \cdot dr} \quad (21)$$

Figure 4:
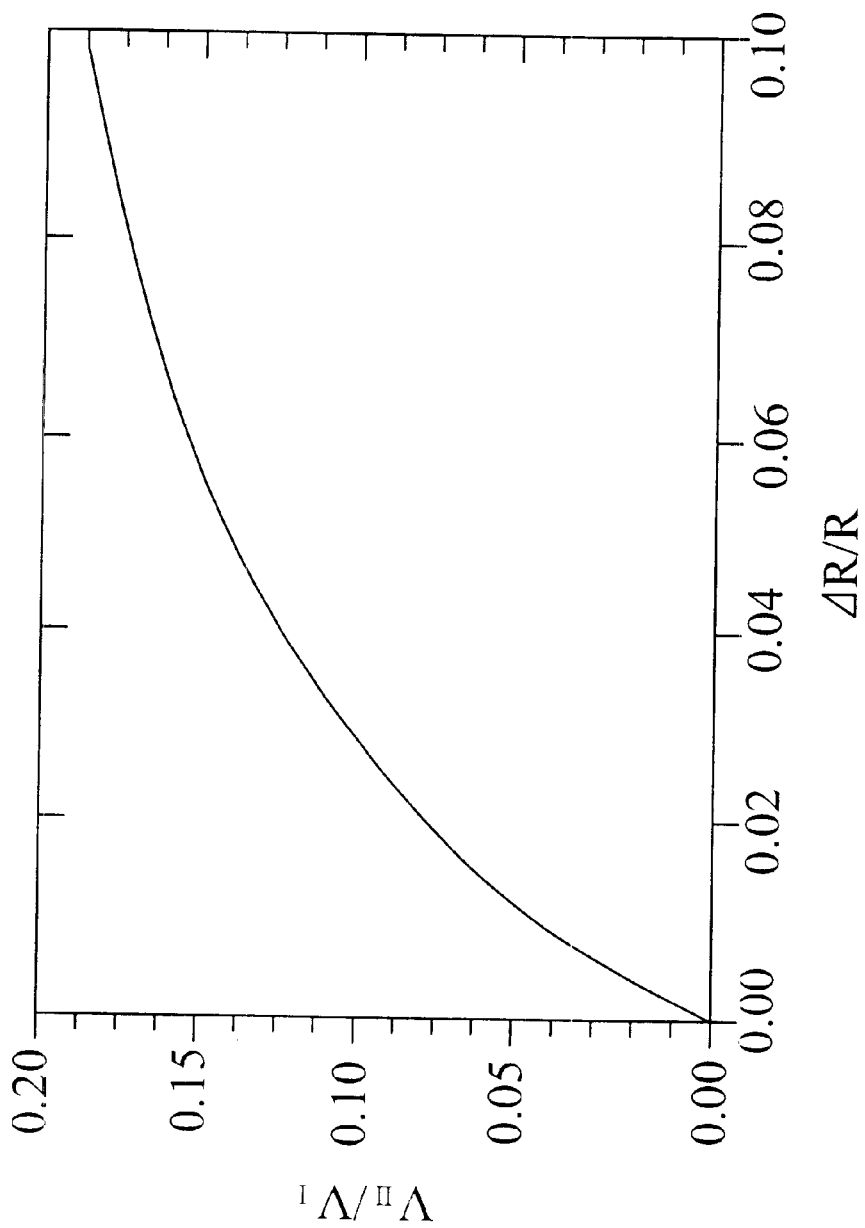
FIG. 4 is a view illustrating a function curve of a fluid section between ratios $$\frac{V_{SII}}{V_{SI}}$$

Referring to FIG. 4, a curve of $$\frac{V_{SII}}{V_{SI}} = f \frac{\Delta R}{R_S}$$

is shown. Referring to FIG. 5, a curve of a $$\frac{Q_{II}}{Q_I} = f\left(\frac{\Delta R}{R_S}\right)$$

is shown.

The flow rate $Q_{II}$ is obtained by multiplying the flow rate $Q_I$ measured by the ultrasonic wave by a. Therefore, the total flow rate is as follows:

$$Q = Q_I + aQ_I = Q_I(1+a) \quad (22)$$

In case that $$\frac{\Delta R}{R_S} = 0.0025 : 0.05, \quad a = \frac{Q_{II}}{Q_I}$$

is a ration of 0.0006:0.016. In case that the inner diameter $D_S = 1000$ mm $$\frac{\Delta R}{R} = 0.05,$$

$\Delta R = 25$ mm. If a calculation error of $Q_{II}$ is $\delta_{QII} = 20\%$ and $$\frac{\Delta R}{R_S} = 0.05,$$

a measuring error component of the flow rate Q due to $\delta_{QII}$ is obtained by the expression (12) as follows:

$$\delta_{IIQ} = \frac{\delta_{QII}}{1 + \frac{Q_I}{Q_{II}}} = \frac{\delta_{QII}}{1 + \frac{1}{a}} \quad (12)$$

Therefore, if $\delta_{QII} = 20\%$ and $a = \sim 0.016$ is substituted into the expression (12), $\delta_{QII} = 0.315\%$. If $$\frac{\Delta R}{R_S} = 0.025,$$

$\delta_{QII} \approx 0.14\%$. Herein, it is noted that the calculation error of $Q_{II}$ is not less than 20%, the error component to affect the total flow rate error is 0.14~0.315%. The selection of $$\frac{\Delta R}{R_S} = 0.025$$

or 0.05 means that the deviation of the inner diameter is 2.5% or 5% (referring to the expression 9). In that case, the calculation error $\delta_S$ of the section S means $2\delta_D = 5\sim10\%$. It means that the flow rate $\delta_Q \geq (5\sim10)\%$. If the ultrasonic measuring error $\delta_{QI}$ in the section $S_I$ is 1%, the total flow rate measuring error is as follows:

$$\delta_Q = \delta_{QI} + \delta_{QII} = 1.14 \sim 1.315\%$$

But, if $\delta_S = 5\sim10\%$ according to the conventional ultrasonic flow rate measuring method, $\delta_Q \approx 6.0\sim11\%$.

Referring to FIG. 6, a flow velocity distribution curve measured on a plurality of chords is shown in an asymmetrical arrangement. At that time, an average flow velocity of a portion that is not measured is as follows:

$$V_{II} \approx 1/2(V_{II1} + V_{II2}) \quad (23)$$

As shown in FIG. 6, $V_{II2} \ll V_{II1}$. As a result, it is very similar to $V_{II}$ corresponding to the flow velocity distribution of the symmetrical arrangement.

Therefore, if the section of the fluid flowing section is not exactly measured, the deviation of the inner diameter of a pipe exists and the pipe is oval, the invention can enhance the accuracy of the flow rate measuring.

What is claimed is:

1. An ultrasonic multi-channel flow rate measuring method for measuring a flow rate of a fluid in a fluid section of a pipe, the method comprising:

measuring by using at least one ultrasonic wave, a flow rate $Q_I$ of a section $S_I$ representing a circular section having a radius R of the fluid section, the radius R being less than a standard radius Rs of the pipe;

calculating by using a flow velocity distribution curve, a flow rate $Q_{II}$ of a section $S_{II}$ representing a remaining section of the fluid section not measured by the ultrasonic wave, the flow velocity distribution curve including a relationship between a ratio $V_{II}/V_I$ and a ratio $\Delta R/R_s$, wherein $V_{II}$ represents a measured flow velocity of the section $S_{II}$, $V_I$ represents a flow velocity of the section $S_I$, and $\Delta R$ represents a sum of: (i) a maximum deviation of the standard radius $R_S$; (ii) a thickness of a corrosive resistance layer in the pipe; and (iii) a deviation of the thickness of the corrosive resistance layer; and determining a total flow rate Q of the fluid section based on a sum of the flow rate $Q_I$ and the flow rate $Q_{II}$.

2. The method as claimed in claim 1, wherein the flow rate $Q_{II}$ of the section $S_{II}$ is calculated based on a product of the flow velocity $V_{II}$ of the section $S_{II}$ and an area of the section $S_{II}$, the area of the section $S_{II}$ being based on the equation:

$$area(S_{II}) = \pi R_s^2 \left[ 1 - \left(1 - \frac{\Delta R}{R_s}\right)^2 \right]$$

where $area(S_{II})$ represents the area of the section $S_{II}$.

3. The method as claimed in claim 1, wherein determining the total flow rate Q includes determining the total flow rate Q based on the equation:

$$Q = Q_I(1+a)$$

where a represents the ratio $Q_{II}/Q_I$.

4. The method as claimed in claim 3, wherein the ratio $Q_{II}/Q_I$ is determined from the equation:

$$\frac{Q_{II}}{Q_I} = \frac{(R_s^2 - R^2)}{R^2} \frac{V_{II}}{V_I}.$$

5. The method as claimed in claim 1, wherein the standard radius $R_S$ is specified by a manufacturer of the pipe.

6. The method as claimed in claim 1, wherein measuring the flow rate $Q_I$ comprises using a plurality of paired transducers to measure the flow velocity $V_I$, each paired transducer being disposed along a corresponding chord of the section $S_I$, and where the flow velocity $V_I$ includes an average of a flow velocity measured for each chord.

7. The method as claimed in claim 6, wherein a distance L between each transducer of paired transducers is determined from the equation:

$$L = \frac{2R}{\sin(\varphi)}$$

where $\varphi$ represents a mounting angle of the transducer.

* * * * *